(12) United States Patent
Ishida et al.

(10) Patent No.: US 12,445,297 B2
(45) Date of Patent: Oct. 14, 2025

(54) CONTROL APPARATUS, DATA REGISTRATION SYSTEM, AND CONTROL PROGRAM

(71) Applicant: NTT, Inc., Tokyo (JP)

(72) Inventors: Tatsuro Ishida, Musashino (JP); Atsushi Nakadaira, Musashino (JP); Shigeru Fujimura, Musashino (JP); Shigenori Ohashi, Musashino (JP); Hiroki Watanabe, Musashino (JP)

(73) Assignee: NTT, Inc., Tokyo (JP)

( * ) Notice: Subject to any disclaimer, the term of this patent is extended or adjusted under 35 U.S.C. 154(b) by 219 days.

(21) Appl. No.: 17/626,056

(22) PCT Filed: Jul. 12, 2019

(86) PCT No.: PCT/JP2019/027632
§ 371 (c)(1),
(2) Date: Jan. 10, 2022

(87) PCT Pub. No.: WO2021/009789
PCT Pub. Date: Jan. 21, 2021

(65) Prior Publication Data
US 2022/0255754 A1    Aug. 11, 2022

(51) Int. Cl.
*H04L 9/32* (2006.01)
*H04L 9/00* (2022.01)

(52) U.S. Cl.
CPC ............ *H04L 9/3247* (2013.01); *H04L 9/50* (2022.05)

(58) Field of Classification Search
CPC ....... H04L 9/3247; H04L 9/50; H04L 9/3239; G06F 21/62; G06F 21/64; G06F 21/6254; G06F 21/602; G06V 20/52; G06V 40/10
See application file for complete search history.

(56) References Cited

U.S. PATENT DOCUMENTS 10,594,498 B2 *  3/2020  Uhr ................... H04W 12/0431
10,944,548 B2 *  3/2021  Aleksander ........... H04L 9/3247
(Continued)

FOREIGN PATENT DOCUMENTS

JP    2017050763    3/2017

OTHER PUBLICATIONS

Bitbank Inc. et al., "The Impact of Blockchain," Nikkei Business Publications, Jun. 2016, 10 pages (No English Translation).
(Continued)

*Primary Examiner* — Matthew Smithers
(74) *Attorney, Agent, or Firm* — Fish & Richardson P.C.

(57) ABSTRACT

A data registration system of the present embodiment includes a control device 20 and a cooperating device 30. The control device 20 includes a communication unit 21 that receives a data registration request to which an electronic signature of a user is added, a verification unit 22 that verifies identity of the user, a transaction generation unit 23 that, if identity of the user is verified, takes out data included in the data registration request, transmits the data to the cooperating device 30 to store the data in the cooperating device 30, generates a transaction based on the data registration request, and adds an electronic signature to the transaction, the transaction including information for accessing the data stored in the cooperating device 30, and a blockchain control unit 24 that issues the transaction to a blockchain network. The cooperating device 30 includes a communication unit 31 that receives the data and a storage unit 33 that stores the data in association with the transaction.

7 Claims, 6 Drawing Sheets

(56) References Cited

U.S. PATENT DOCUMENTS

| | | | |
|---|---|---|---|
| 11,880,828 B2* | 1/2024 | Alastair | H04L 9/32 |
| 11,917,049 B2* | 2/2024 | Aleksander | H04L 63/0442 |
| 2015/0269570 A1 | 9/2015 | Phan et al. | |
| 2017/0005804 A1* | 1/2017 | Zinder | H04L 9/3247 |
| 2017/0250972 A1* | 8/2017 | Ronda | H04L 9/0891 |
| 2017/0302663 A1* | 10/2017 | Nainar | H04L 63/123 |
| 2018/0101844 A1* | 4/2018 | Song | H04L 9/3247 |
| 2018/0241551 A1 | 8/2018 | Fujimura et al. | |
| 2018/0331835 A1* | 11/2018 | Jackson | H04L 9/3297 |
| 2019/0098015 A1* | 3/2019 | Hookham-Miller | G06F 21/64 |
| 2019/0104102 A1* | 4/2019 | Khan | H04L 9/3239 |
| 2019/0182042 A1* | 6/2019 | Ebrahimi | H04L 9/3234 |
| 2019/0207748 A1* | 7/2019 | Courtney | H04L 9/3239 |
| 2019/0251648 A1* | 8/2019 | Liu | G06F 16/27 |
| 2019/0266576 A1* | 8/2019 | McCauley | G06Q 20/065 |
| 2019/0325044 A1* | 10/2019 | Gray | H04L 9/3239 |
| 2019/0372756 A1* | 12/2019 | Kim | H04L 9/0863 |
| 2019/0378127 A1* | 12/2019 | Dudar | H04L 9/0637 |
| 2019/0384594 A1* | 12/2019 | Michiyama | G06F 21/57 |
| 2020/0195647 A1* | 6/2020 | Sun | G06F 21/62 |
| 2020/0272619 A1* | 8/2020 | Alferov | H04L 9/3239 |
| 2020/0412554 A1* | 12/2020 | Lee | G06F 16/9035 |
| 2021/0075623 A1* | 3/2021 | Petersen | G06Q 20/401 |
| 2021/0250177 A1* | 8/2021 | Yoo | G16Y 40/50 |

OTHER PUBLICATIONS

International Search Report in International Appln. No. PCT/JP2019/027632, dated Oct. 21, 2019, 3 pages (with English Translation).
Kishigami et al., Introduction to Blockchain Technology, First Edition, Morikita Publishing Co., Ltd., Aug. 2017, pp. 77-78, 4 pages (No English Translation).

* cited by examiner

CONTROL APPARATUS, DATA REGISTRATION SYSTEM, AND CONTROL PROGRAM

CROSS-REFERENCE TO RELATED APPLICATIONS

This application is a National Stage application under 35 U.S.C. § 371 of International Application No. PCT/JP2019/027632, having an International Filing Date of Jul. 12, 2019, the disclosure of which is considered part of the disclosure of this application, and is incorporated in its entirety into this application.

TECHNICAL FIELD

The present invention relates to a control apparatus, a data registration system, and a control program.

BACKGROUND ART

Blockchains are very resistant to tampering. Focusing on this point, PTL 1 proposes a technology for applying a blockchain to management of permission for contents.

CITATION LIST

Patent Literature

[PTL 1] Japanese Patent Application Publication No. 2017-050763

Non Patent Literature

[NPL 1] Junichi Kishigami, Shigeru Fujimura, Hiroki Watanabe, Shigenori Ohashi, Atsushi Nakadaira, "Introduction to Blockchain Technology", first edition, Morikita Publishing Co., Ltd., August 2017, pp. 77-78

SUMMARY OF THE INVENTION

Technical Problem

In a case where contents are managed using a blockchain, it is conceivable to use a method of managing the body of contents in a system that is configured to cooperate with the blockchain. For example, the body of contents is stored in a file system other than the blockchain, and information that is registered in the blockchain and the body of contents are associated. If a control device is configured to mediate registration of information and registration of data to the blockchain, a user only needs to request the control device to register contents data, which is convenient. For example, the control device accepts registration of contents data from the user, registers information (e.g., creator information, right holder information, and the like) related to the contents data in the blockchain, and stores the body of contents in the file system.

When registering information in the blockchain, the control device adds an electronic signature to the transaction. When viewed from the blockchain side, the control device is interposed between the user and the blockchain, and therefore, there has been a problem that it is not possible to trust whether information included in the transaction is information given from the user.

The present invention is devised in view of the above described problem, and has an object of the present invention is to ensure authenticity of information that is registered via a control device.

Means for Solving the Problem

A control apparatus of one aspect of the present invention includes a communication unit configured to receive a data registration request to which an electronic signature of a user is added, a verification unit configured to perform identity verification based on the electronic signature of the user, a transaction generation unit configured to, if identity of the user is verified, generate a transaction based on the data registration request and add an electronic signature to the transaction, and a blockchain control unit configured to issue the transaction to a blockchain network.

A data registration system of another aspect of the present invention is a data registration system that includes a control apparatus and a cooperating apparatus. In the data registration system, the control apparatus includes a communication unit configured to receive a data registration request to which an electronic signature of a user is added, a verification unit configured to perform identity verification based on the electronic signature of the user, a transaction generation unit configured to, if identity of the user is verified, take out data included in the data registration request, transmit the data to the cooperating apparatus to store the data in the cooperating apparatus, generate a transaction based on the data registration request, and add an electronic signature to the transaction, the transaction including information for accessing the data stored in the cooperating apparatus, and a blockchain control unit configured to issue the transaction to a blockchain network, and the cooperating apparatus includes a communication unit configured to receive the data, and a storage unit configured to store the data in association with the transaction.

Effects of the Invention

According to the present invention, it is possible to ensure authenticity of information registered via the control device.

DESCRIPTION OF EMBODIMENTS

The following describes an embodiment of the present invention with reference to the drawings.

Figure 1:
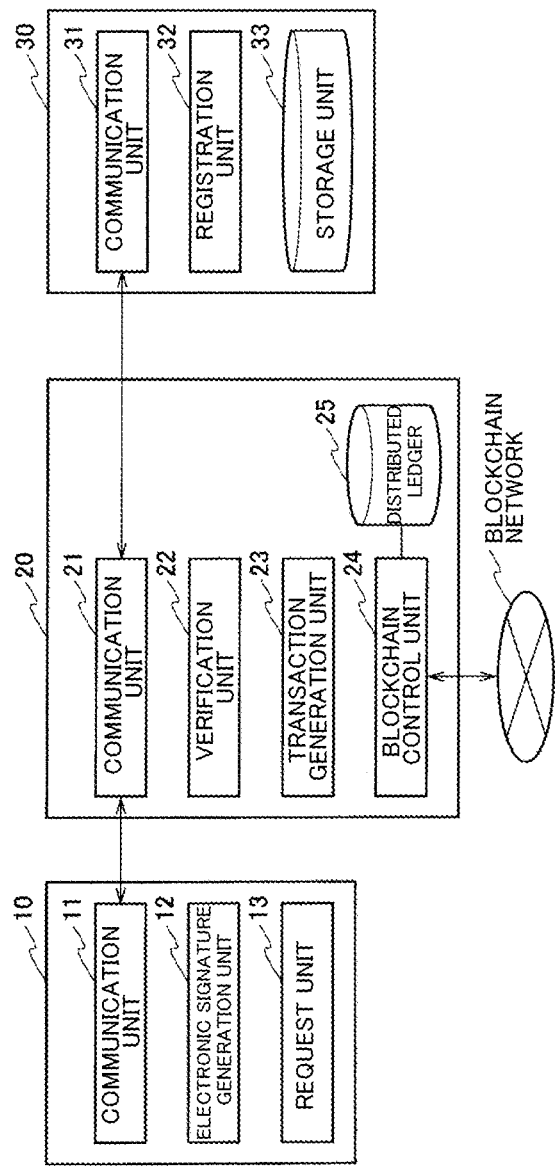
FIG. 1 is a diagram showing an overall configuration of a data registration system of the present embodiment.

FIG. 1 is a diagram showing an overall configuration of a data registration system of the present embodiment. The data registration system shown in FIG. 1 includes a control device 20 and a cooperating device 30. The control device 20 is connected to a blockchain network. Multiple devices other than the control device 20 are also connected to the blockchain network. A plurality of control devices 20 may be connected to the blockchain network. Devices participating in the blockchain network hold a distributed ledger in a gently synchronized manner.

A user terminal 10 transmits, to the control device 20, a data registration request to which an electronic signature of the user is added. The control device 20 performs identity verification for the electronic signature, and if identity is verified, the control device 20 issues, to the blockchain network, a transaction to which an electronic signature is added using a private key held by the control device 20, and registers data to the cooperating device 30 as needed. The cooperating device 30 accepts registration of the data, and stores the data in association with information registered in the blockchain. The following describes each device.

The user terminal 10 includes a communication unit 11, an electronic signature generation unit 12, and a request unit 13. Devices with a communication function, such as a portable terminal and a personal computer can be used as the user terminal 10.

The communication unit 11 transmits, to the control device 20, a data registration request to which the electronic signature of the user is added. The communication unit 11 may receive a reply to the data registration request and an identity verification request from the control device 20, and transmit a reply to the identity verification request.

The electronic signature generation unit 12 adds, to the data registration request, an electronic signature using a private key that is held by the electronic signature generation unit 12. The electronic signature is used by the control device 20 to verify identity of the user.

The request unit 13 generates a data registration request for registering data in the data registration system. The data registration request includes information that is to be registered in the blockchain. The data registration request may include data, such as audio data, image data, or video data, that is to be registered in the data registration system.

The control device 20 includes a communication unit 21, a verification unit 22, a transaction generation unit 23, a blockchain control unit 24, and a distributed ledger 25.

The communication unit 21 receives the data registration request to which the electronic signature is added from the user terminal 10. The communication unit 21 transmits data to the cooperating device 30 as needed.

The verification unit 22 performs identity verification for the electronic signature added to the data registration request. For example, the verification unit 22 notifies the user terminal 10 of an inquiry as to whether the user himself/herself has transmitted the data registration request, and determines that the data registration request has been transmitted by the user if the user replies to the inquiry notification. Alternatively, the verification unit 22 may send the inquiry to a portable terminal of the user that is registered in advance via another route, rather than to the user terminal 10. For example, the user registers in advance an address of the user for the short message service (SMS). The verification unit 22 transmits a PIN code using the SMS and verifies identity by making the user transmit the PIN code from a portable terminal or the user terminal 10 to the control device 20. The verification unit 22 may verify identity using a common multi-factor authentication method.

The transaction generation unit 23 generates a transaction that includes information included in the received data registration request, and adds an electronic signature to the transaction using a private key that is held by the control device 20. The transaction may include the data registration request that is transmitted from the user and includes the electronic signature of the user.

The transaction generation unit 23 may take out data included in the data registration request and register the data in the cooperating device 30. In a case where the data is registered in the cooperating device 30, the transaction generation unit 23 may generate a transaction that includes information for accessing the data. For example, if the cooperating device 30 is a storage, the transaction generation unit 23 generates a transaction that includes information included in the data registration request and a file path that indicates the location where the data is stored in the storage. If the control device 20 takes out data from the data registration request and registers the data in the cooperating device 30, the amount of data that is registered in the blockchain can be reduced. Information that is registered in the blockchain is very resistant to tampering. Therefore, in a case where information included in the data registration request is information related to data, such as information of the creator of the data and information of a right holder, there is no risk that these types of pieces of information are tempered with.

The blockchain control unit 24 maintains the system of the blockchain by cooperating with devices that are connected to the blockchain network in an autonomous and distributed manner. The blockchain control unit 24 accesses the distributed ledger 25 and updates the blockchain in the distributed ledger 25.

The blockchain control unit 24 issues the transaction generated by the transaction generation unit 23 to the blockchain network. The transaction is broadcast to the blockchain network and is collected into a block and registered in the blockchain by devices participating in the blockchain network.

If the data registration request is a request for registering data in the blockchain using a smart contract, the transaction generation unit 23 generates a transaction that is directed to the smart contract. Note that, it is assumed that the smart contract is registered in the blockchain and the address of the smart contract is already known. For example, if the data registration request is a request for registering purchase information related to contents, the transaction generation unit 23 generates a transaction that is directed to the smart contract and includes the purchase information related to contents. When the transaction is registered in the blockchain, the smart contract is executed and the purchase information related to contents is registered in the blockchain.

The distributed ledger 25 stores the blockchain in the latest state nearly in real time. The distributed ledger 25 may include a state database for managing a state value or the state of the smart contract. For example, information such as purchase information related to contents is managed in the state database.

Note that a node function (a function for participating in the blockchain network) that includes the distributed ledger 25 may be provided outside the control device 20. For example, the blockchain control unit 24 functions as an interface to the outside and communicates with a device that includes the distributed ledger 25. The blockchain control unit 24 transmits a transaction to the device and acquires data registered in the blockchain from the device.

The cooperating device 30 includes a communication unit 31, a registration unit 32, and a storage unit 33. The cooperating device 30 may be a storage that stores data, or may also be a server that belongs to a distributed file management system for managing files by a plurality of devices in a distributed manner, for example.

The communication unit 31 receives data from the control device 20.

The registration unit 32 stores the received data in the storage unit 33.

The storage unit 33 stores the data. The storage unit 33 may store the data in association with a transaction. For example, the storage unit 33 stores an association between data and a transaction ID. A user of the data can acquire information related to the data, such as information of the creator of the data and information of a right holder by acquiring the transaction associated with the data from the blockchain.

Note that the user terminal 10 may have the functions of the control device 20. For example, a personal computer is used as the user terminal 10, and an application for realizing the functions of the control device 20 is executed by the personal computer. After the user gives data that the user intends to register to the application, the application verifies identity of the user, and registers the data in the blockchain.

Figure 2:
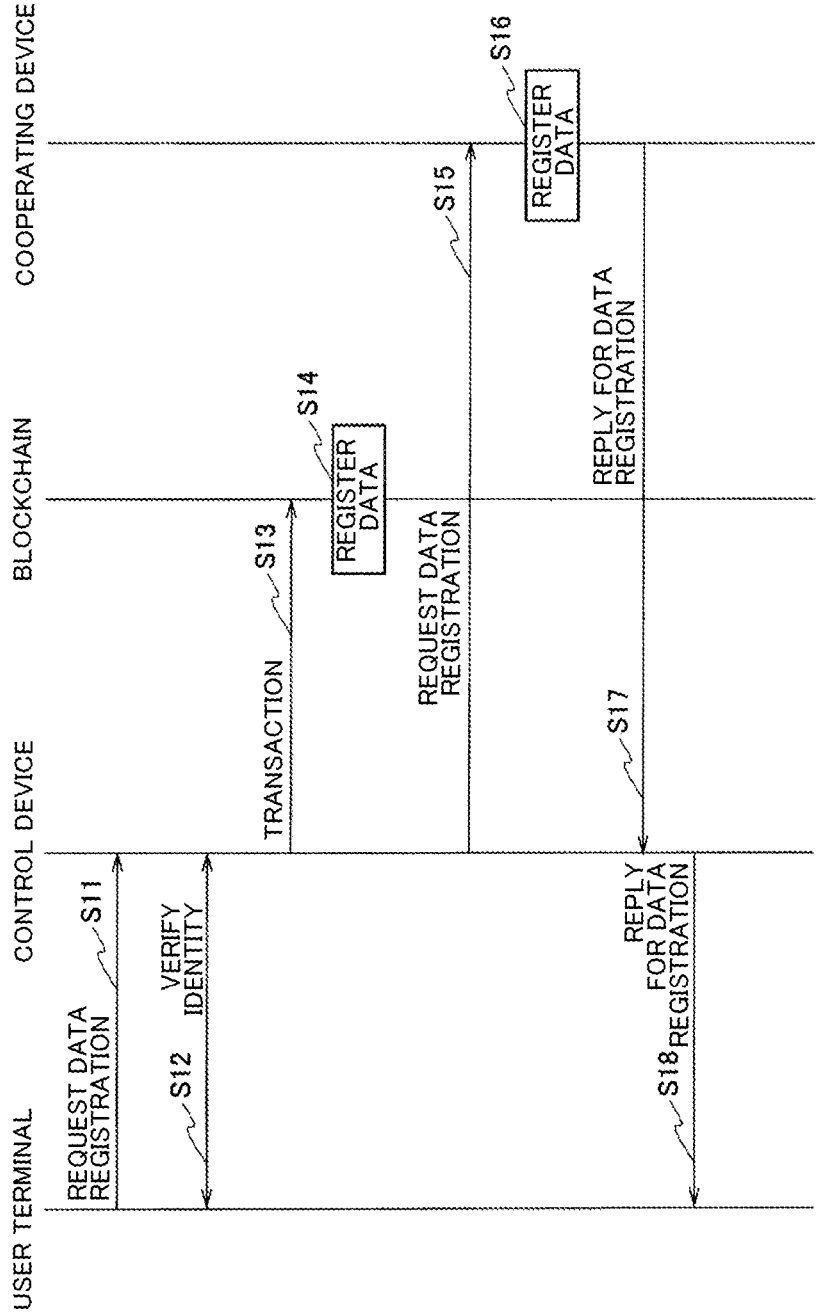
FIG. 2 is a sequence diagram showing a flow of processing performed in the data registration system according to the present embodiment.

Processing performed in the data registration system of the present embodiment will be described with reference to FIG. 2.

In step S11, the user terminal 10 transmits a data registration request to which an electronic signature is added to the control device 20.

In step S12, the control device 20 verifies identity of the user who has transmitted the data registration request. The control device 20 notifies the user terminal 10 or a portable terminal of the user of an inquiry. The control device 20 verifies identity of the user based on a reply to the notification. If identity may not be verified, the control device 20 ends the processing. The control device 20 may inform the user terminal 10 of the information that data may not be registered.

In step S13, the control device 20 generates a transaction to which an electronic signature is added and issues the transaction to the blockchain network.

In step S14, the transaction issued by the control device 20 is registered in the blockchain.

Processing of the following steps S15 to S17 is performed as needed.

In step S15, the control device 20 transmits data to the cooperating device 30. The control device 20 may transmit ID of the transaction that is registered in the blockchain to the cooperating device 30.

In step S16, the cooperating device 30 registers the data. The cooperating device 30 may register the data in association with the transaction.

In step S17, the cooperating device 30 replies to the control device 20 to inform the control device 20 that the data has been registered.

Note that if information for accessing the data is acquired after the registration of the data in step S17, steps S13 and S14 may be performed after the processing performed in steps S15 to S17. After step S17, the control device 20 generates a transaction that includes the information for accessing the data. Alternatively, after the processing performed in steps S15 to S17, the control device 20 may generate another transaction that includes the information for accessing the data and may issue the transaction to the blockchain network.

In step S18, the control device 20 informs the user terminal 10 that the data has been registered.

A data registration system according to a modified example of the present embodiment will be described with reference to FIG. 3.

Figure 3:
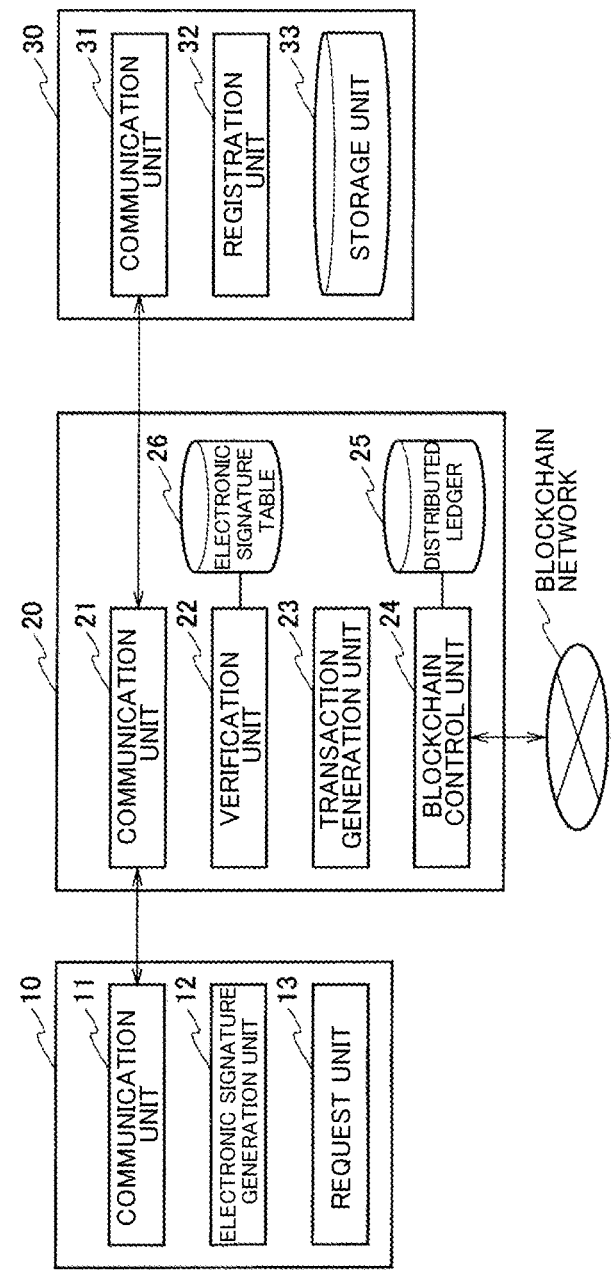
FIG. 3 is a diagram showing an overall configuration of a data registration system of to a modified example.

The data registration system of the modified example shown in FIG. 3 includes the control device 20 and the cooperating device 30, similarly to the data registration system shown in FIG. 1. The data registration system of FIG. 3 differs from that shown in FIG. 1 in that the control device 20 includes an electronic signature table 26. Configurations of the user terminal 10 and the cooperating device 30 are the same as those shown in FIG. 1. The following describes differences from the data registration system shown in FIG. 1.

The electronic signature table 26 is a table in which users and electronic signatures are associated with each other, such as user A-electronic signature A, user B-electronic signature B, and user C-electronic signature C, for example.

After receiving a data registration request to which an electronic signature is added from the user terminal 10, the verification unit 22 refers to the electronic signature table 26 and checks whether the electronic signature table 26 includes the electronic signature added to the data registration request. If the electronic signature table 26 includes the electronic signature, the verification unit 22 determines that the user who has transmitted the request is an authorized user.

Figure 4:
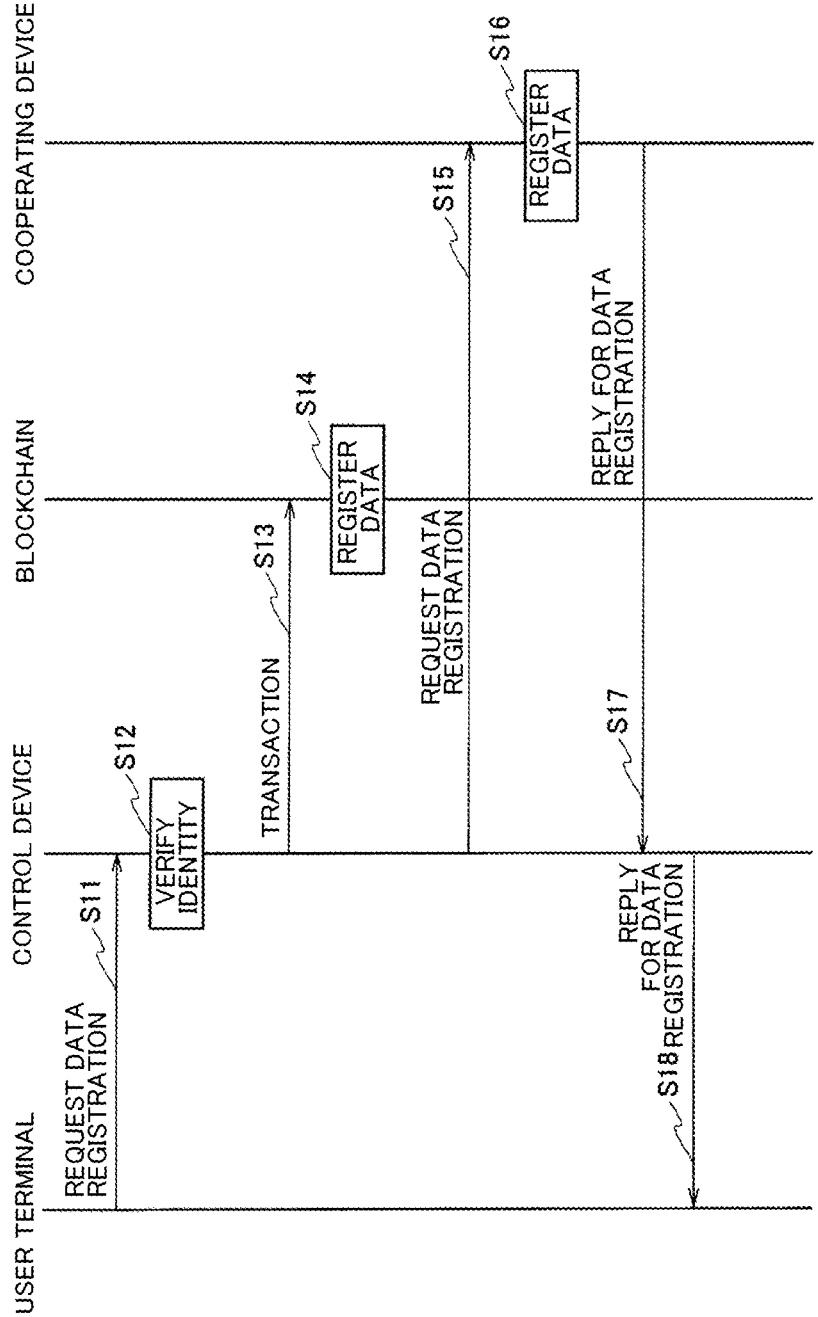
FIG. 4 is a sequence diagram showing a flow of processing performed in the data registration system according to the modified example.

Processing performed in the data registration system of the modified example will be described with reference to FIG. 4. The processing performed in the data registration system of the modified example differs from the processing shown in FIG. 2 in the identity verification processing performed in step S12.

In step S11, the user terminal 10 transmits a data registration request to which an electronic signature is added to the control device 20.

In step S12, the control device 20 verifies identity of the user who has transmitted the data registration request. The control device 20 checks whether the electronic signature table 26 includes the electronic signature added to the data registration request. If the electronic signature table 26 includes the electronic signature, the control device 20 determines that identity is verified. Alternatively, if identity may not be verified, the control device 20 ends the processing.

In step S13, the control device 20 generates a transaction to which an electronic signature is added and issues the transaction to the blockchain network.

In step S14, the transaction issued by the control device 20 is registered in the blockchain.

Processing in the following steps S15 to S17 is performed as needed.

In step S15, the control device 20 transmits data to the cooperating device 30.

In step S16, the cooperating device 30 registers the data.

In step S17, the cooperating device 30 informs the control device 20 that the data has been registered.

In step S18, the control device 20 informs the user terminal 10 that the data has been registered.

Figure 5:
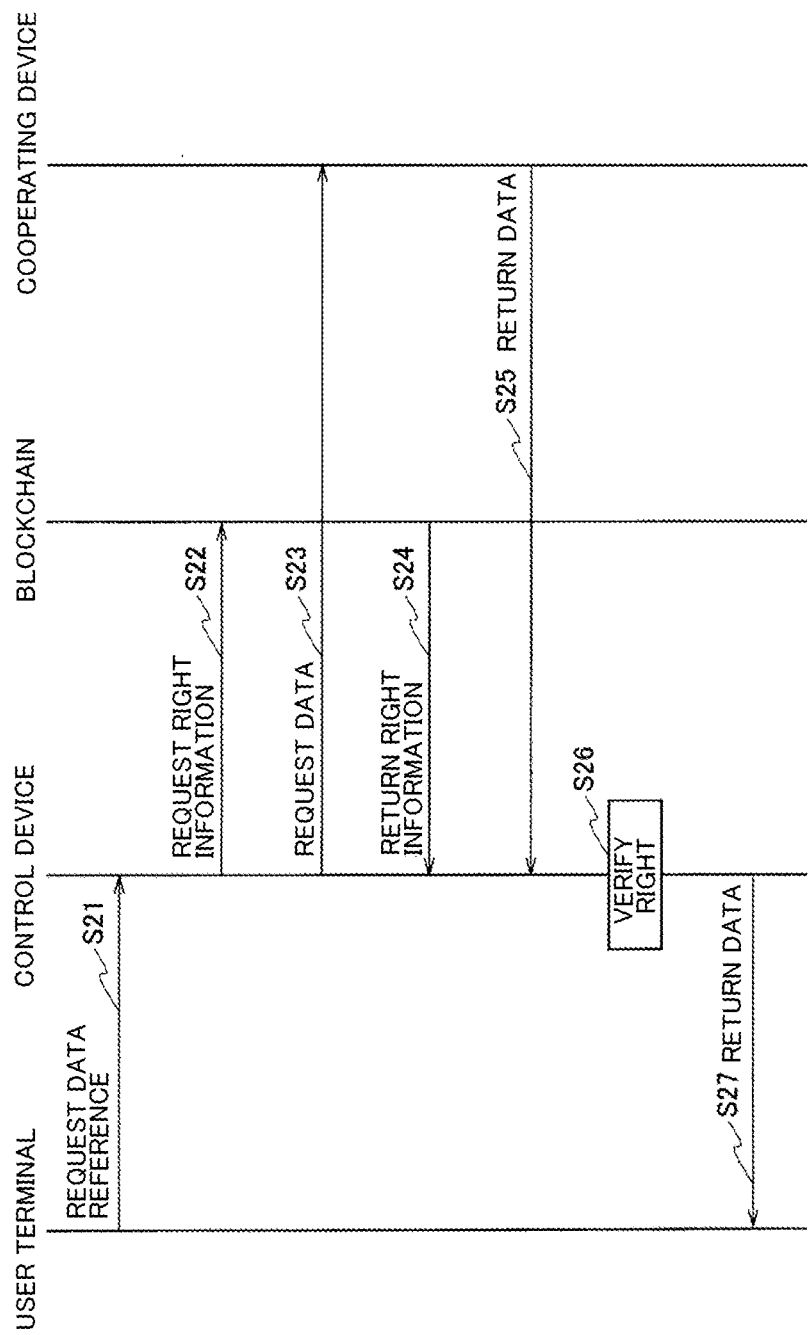
FIG. 5 is a sequence diagram showing a flow of processing for referring to data registered in the data registration system.

Processing for referring to data that is registered in the data registration system will be described with reference to FIG. 5. Assume that the data is registered in the cooperating device 30 and access right information regarding the data is registered in the blockchain. A transaction that includes the access right information regarding the data may be registered in the blockchain when the data is registered in the processing shown in FIG. 2 or 4, for example.

In step S21, the user terminal 10 transmits a data reference request to the control device 20. The data terminal 10 does not need to be the data terminal 10 of the user who has registered the data. The data reference request includes information that is needed for right verification processing performed by the control device 20. An electronic signature of the user may be added to the data reference request.

In step S22, the control device 20 transmits a right information request to the blockchain.

In step S23, the control device 20 transmits a data request to the cooperating device 30.

In step S24, the control device 20 acquires right information from the blockchain. Note that the control device 20 may acquire the right information by referring to the distributed ledger 25.

In step S25, the control device 20 acquires data from the cooperating device 30.

In step S26, the control device 20 verifies the right to access the data for the user who has transmitted the data reference request based on the right information acquired from the blockchain. Note that the control device 20 may transmit the data request to the cooperating device 30 after verifying the right to access the data. That is, the control device 20 performs the processing in steps S23 and S25 after performing the right verification processing in step S26.

If the user has the right, the control device 20 transmits the data to the user terminal in step S27. Alternatively, if the user does not have the right, the control device 20 returns an error to the user terminal 10.

Figure 6:
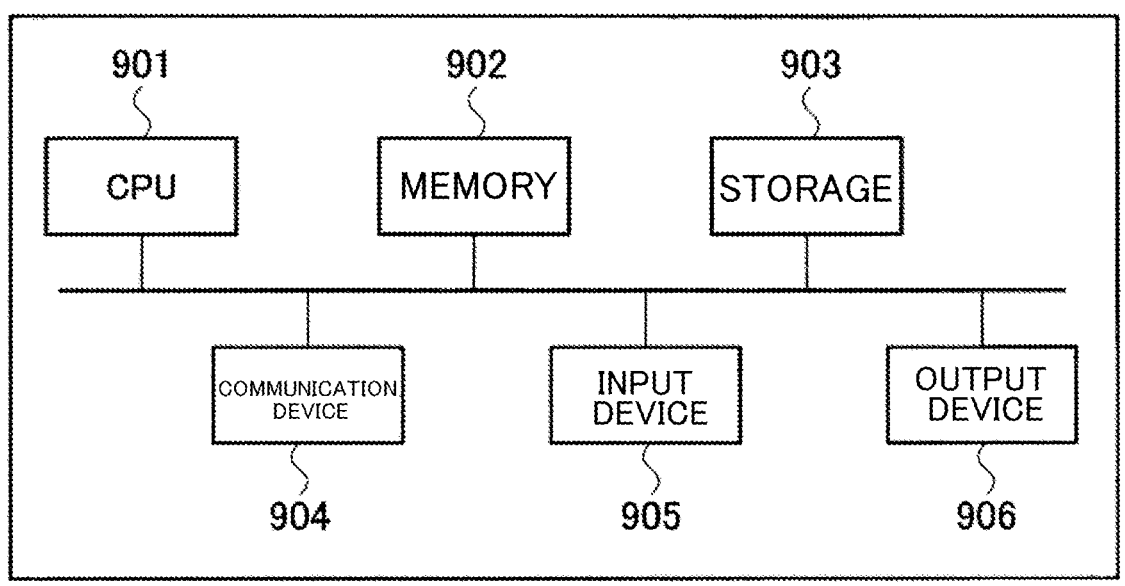
FIG. 6 is a diagram showing an example of a hardware configuration of a control device.

It is possible to use, as the control device 20 and the cooperating device 30 described above, a general-purpose computer system that includes a central processing unit (CPU) 901, a memory 902, a storage 903, a communication device 904, an input device 905, and an output device 906 as shown in FIG. 6, for example. In this computer system, the control device 20 and the cooperating device 30 are realized as a result of the CPU 901 executing a predetermined program that is loaded to the memory 902. The program can be recorded in a computer-readable recording medium such as a magnetic disk, an optical disk, or a semiconductor memory, and can also be distributed via a network.

As described above, the data registration system according to the present embodiment includes the control device 20 and the cooperating device 30. The control device 20 includes the communication unit 21 that receives a data registration request to which an electronic signature of a user is added, a verification unit 22 that verifies identity of the user, a transaction generation unit 23 that, if identity of the user is verified, transmits data that is taken out from the data registration request to the cooperating device 30 to store the data in the cooperating device 30, generates a transaction that includes information for accessing the data, based on the data registration request, and adds an electronic signature to the transaction, and the blockchain control unit 24 that issues the transaction to a blockchain network. The cooperating device 30 includes the communication unit 31 that receives data and the storage unit 33 that stores the data in association with a transaction. Information is registered in the blockchain after the control device 20 verifies identity, and therefore another user can trust the information registered in the blockchain via the control device 20.

REFERENCE SIGNS LIST

10 User terminal
11 Communication unit
12 Electronic signature generation unit
13 Request unit
20 Control device
21 Communication unit
22 Verification unit
23 Transaction generation unit
24 Blockchain control unit
25 Distributed ledger
26 Electronic signature table
30 Cooperating device
31 Communication unit
32 Registration unit
33 Storage unit

The invention claimed is:

1. A control apparatus interposed between a user terminal of a user and a public blockchain network, the control apparatus comprising one or more hardware processors configured to:
receive a data registration request to which an electronic signature of the user is added, wherein the data registration request comprises (i) information comprising metadata for a set of to-be-registered data and (ii) the set of to-be-registered data, wherein the electronic signature of the user is held by the user terminal of the user;
perform identity verification based on the electronic signature of the user;
in response to determining that an identity of the user is verified,
extract the set of to-be-registered data from the data registration request;
transmit the set of to-be-registered data to a cooperating apparatus, wherein the cooperating apparatus stores the set of to-be-registered data in a storage of the cooperating apparatus;
generate a transaction including (a) the information comprising the metadata that is included in the data registration request and (b) a file path indicating a location of the set of to-be-registered data stored in the storage of the cooperating apparatus;
add an electronic signature to the transaction using a private key held by the control apparatus;
broadcast the transaction to the public blockchain network that is outside of the control apparatus and configured to register the transaction in a block of the public blockchain network.

2. The control apparatus according to claim 1, wherein the one or more hardware processors are configured to:
notify the user of an inquiry and perform the identity verification based on a reply to the notification.

3. The control apparatus according to claim 1, wherein the one or more hardware processors are further configured to:
hold, in an electronic signature table, that the electronic signature of the user, and
perform the identity verification for the user by referring to the electronic signature table.

4. A data registration system interposed between a user terminal of a user and a public blockchain network, the data registration system comprising:
a control apparatus; and
a cooperating apparatus, wherein
the control apparatus includes one or more hardware processors configured to:
receive a data registration request to which an electronic signature of a user is added, wherein the data registration request comprises (i) information comprising metadata for a set of to-be-registered data and (ii) the set of to-be-registered data, wherein the electronic signature of the user is held by a user terminal of the user;

perform identity verification based on the electronic signature of the user;

in response to determining that an identity of the user is verified, extract the set of to-be-registered data from the data registration request, transmit the set of to-be-registered data to the cooperating apparatus, wherein the cooperating apparatus stores the set of to-be-registered data in a storage of the cooperating apparatus, generate a transaction including (a) the information comprising the metadata that is included in the data registration request and (b) a file path indicating a location of the set of to-be-registered data stored in the storage of the cooperating apparatus, and add an electronic signature to the transaction using a private key held by the control apparatus; and broadcast the transaction to a public blockchain network that is outside of the control apparatus and configured to register the transaction in a block of the public blockchain network, and the cooperating apparatus includes one or more hardware processors configured to:

receive the set of to-be-registered data; and store the set of to-be-registered data in association with the transaction.

5. A non-transitory computer readable storage medium having stored thereon a control program for causing one or more processors of a control apparatus interposed between a user terminal of a user and a public blockchain network to perform a control method, the control method comprising:

receiving a data registration request to which an electronic signature of a user is added, wherein the data registration request comprises (i) information comprising metadata for a set of to-be-registered data and (ii) the set of to-be-registered data, wherein the electronic signature of the user is held by a user terminal of the user;

performing identity verification based on the electronic signature of the user;

in response to determining that an identity of the user is verified, extracting the set of to-be-registered data from the data registration request;

transmitting the set of to-be-registered data to a cooperating apparatus, wherein the cooperating apparatus stores the set of to-be-registered data in a storage of the cooperating apparatus;

generating a transaction including (a) the information comprising the metadata that is included in the data registration request and (b) a file path indicating a location of the set of to-be-registered data stored in the storage of the cooperating apparatus;

adding an electronic signature to the transaction using a private key held by the control apparatus; and broadcasting the transaction to a public blockchain network that is outside of the control apparatus and configured to register the transaction in a block of the public blockchain network.

6. The non-transitory computer readable storage medium according to claim 5, the control method further comprising:

notifying the user of an inquiry and performing the identity verification based on a reply to the notification.

7. The non-transitory computer readable storage medium according to claim 5, the control method further comprising:

performing the identity verification for the user by referring to an electronic signature table that holds the electronic signature of the user.

* * * * *